(12) United States Patent
Lagarde et al.

(10) Patent No.: US 6,733,413 B2
(45) Date of Patent: May 11, 2004

(54) DRIVE DEVICE FOR MANUALLY DRIVING A BLIND COMPRISING AN EPICYCLIC REDUCTION GEARBOX

(75) Inventors: Eric Paul Lagarde, Sallanches (FR); Yann Le Ru, Thyez (FR)

(73) Assignee: Somfy, Cluses (FR)

( * ) Notice: Subject to any disclaimer, the term of this patent is extended or adjusted under 35 U.S.C. 154(b) by 0 days.

(21) Appl. No.: 10/174,251

(22) Filed: Jun. 18, 2002

(65) Prior Publication Data

US 2003/0004029 A1 Jan. 2, 2003

(30) Foreign Application Priority Data

Jun. 26, 2001 (FR) .............................. 01 08411

(51) Int. Cl.[7] .................. F16H 3/74; F16H 57/08; E06B 9/30; E06B 9/36; E06B 9/56
(52) U.S. Cl. ............. 475/257; 475/349; 168/168.1 P; 168/310
(58) Field of Search .................. 160/168.1 P, 176.1 P, 160/310; 475/257, 14, 266, 349

(56) References Cited

U.S. PATENT DOCUMENTS

| 4,845,321 A | * | 7/1989 | Miki ........................ 200/61.84 |
| 6,401,792 B1 | * | 6/2002 | Mullet et al. ............... 160/188 |
| 6,530,863 B2 | * | 3/2003 | Balli et al. .................. 475/149 |
| 6,550,597 B2 | * | 4/2003 | Taniguchi .................... 192/215 |

FOREIGN PATENT DOCUMENTS

| EP | 229681 A2 | * | 7/1987 | ............ E06B/9/204 |
| EP | 0 372 803 A | | 6/1990 | |
| FR | 2742834 A1 | * | 6/1997 | ............ E06B/9/72 |

OTHER PUBLICATIONS

Engrenages, conception, fabrication, mise en œuvre (Gears, design, manufacture and use), 7th edition by G. Henriot pp. 545 to 553.*

Preliminary Search Report in SN FR 0108411.

* cited by examiner

Primary Examiner—Tisha D Lewis
(74) Attorney, Agent, or Firm—Bugnion S.A.; John Moetteli

(57) ABSTRACT

Drive device for manually driving a blind, roller shutter or the like, comprising an epicyclic reduction gearbox consisting of the juxtaposition of two simple planetary gear trains of type I (A1, B1, a1,/A2, B2, a2), the sun wheels (A1, A2) of which are mechanically linked so as to be driven simultaneously at the same speed and the annulus gear (B1) of the first planetary gear train of which, on the input side of the reduction gearbox, is fixed and the other annulus gear (B2) of which can rotate. The reduction ratio is less than or equal to 3. This drive device makes it possible to obtain a low reduction ratio with a small diameter.

2 Claims, 1 Drawing Sheet

DRIVE DEVICE FOR MANUALLY DRIVING A BLIND COMPRISING AN EPICYCLIC REDUCTION GEARBOX

BACKGROUND OF THE INVENTION

The invention relates to a drive device for manually driving a blind, roller shutter or the like equipped with a winding shaft, comprising an epicyclic reduction gearbox between a manual driving means and the winding shaft of the blind.

PRIOR ART

Such a drive device is known from patent EP 0 372 803, the content of which is incorporated by reference, where it is used for driving a venetian blind by means of a chain driving a chain wheel secured to the sun wheel of a simple epicyclic reduction gearbox comprising a fixed annulus gear and a set of planet pinions carried by a planet carrier constituting the output of the reduction gearbox. The reduction ratio of the reduction gearbox is, for example, 3 to 1.

One of the advantageous properties of an epicyclic or planetary reduction gearbox is the absence of radial resultant of transmission and therefore less stress on the components.

In document EP 0 372 803, the compact nature of the planetary reduction gearbox is brought to the fore. This compact nature is, however, relative. In the device described in the mentioned document, the reduction gearbox is mounted on the outside of the casing housing the winding shaft of the Venetian blind. Arranging the reduction mechanism on the outside of the casing is not only unattractive but also entails the manufacture of two different products, one intended to be operated from the right-hand end and the other intended to be operated from the left-hand end. This is why it is preferable for the reduction mechanism to be able to be housed inside the casing so that there is no longer any lateral appendage and so that the casing can be mounted either way around, with the reduction mechanism at its left-hand end or at its right-handed.

SUMMARY OF THE INVENTION

Experience also shows that for this type of use, a reduction ratio less than 3 is preferable because it makes use somewhat more comfortable on account of the movement of the blind that is obtained with respect to the effort and movement required of the user.

If there is a desire to house the reduction gearbox inside the casing, then one is immediately confronted with problems of embodiment. The problems are that, given that it is desirable to obtain a low reduction ratio, the difference in the pitch diameters of the sun wheel and of the annulus needs to be reduced, and the pitch diameter of the planet pinions has therefore to be reduced. Now, if the pitch diameter of the planet pinions is reduced, then the number of their teeth has also to be reduced, which cannot be done indefinitely, or their module has to be reduced, and this leads to them being weaker. To maintain an acceptable number of teeth on the planet pinions, one is therefore forced to increase the number of teeth on the annulus gear and therefore to increase the overall bulk of the mechanism. Thus, for a planetary gear train of the type described and depicted in document EP 0 372 803, the ratio of 3 to 1 mentioned can be obtained by means of a sun wheel with 20 teeth, planet pinions with 10 teeth and an annulus gear with 40 teeth. To change to a ratio of 2.7 while keeping planet pinions with 10 teeth, the sun wheel has to have 29 teeth and the annulus gear has to have 49 teeth; thus, for a module of 1, the outside diameter of the mechanism needs to be increased by 9 mm.

The problem is therefore one of obtaining a low transmission ratio with a small outside diameter, for example a diameter of 20 mm.

Planetary or epicyclic reduction gearboxes are generally used because of the high reduction ratios that can be obtained with such reduction gearboxes. As far as the knowledge of those skilled in the art in the field of gears, and more particularly planetary reduction gearboxes, is concerned, reference can be made to the very comprehensive work by G. Henriot entitled "Engrenages, conception, fabrication, mise en oeuvre [Gears, design, manufacture and use]", 7th edition. In chapter 13.3 on pages 545 to 553, Henriot deals with composite gear trains. A composite gear train is formed of the juxtaposition of two simple planetary gear trains. Henriot shows the 12 combinations that can be obtained with two simple planetary gear trains of type I, but it is also possible to obtain 12 combinations by combining simple planetary gear trains of type II, III or IV or by combining the types with one another. For each combination, there are therefore 10 options for combining the types, namely I-I, I-II, I-III, I-IV, II-II, etc., which represents 120 combinations. Depending on the choice of input, fixed point and output of the reduction gearbox, each combination can give rise to 6 different couplings, which gives a total of 720 options.

Overcoming the existing prejudices regarding the contradiction there is between the set conditions, namely a reduction ratio less than 3 and a small diameter, the inventor asked himself whether there might be one possible combination of simple planetary gear trains that would allow said conditions to be satisfied and have a simple architecture so as to make it easier to manufacture and so as to limit its cost.

After numerous calculations and selection operations, it was found that two reduction gearboxes allow the stated objectives to be achieved. These two reduction gearboxes have common characteristics, namely the fact that the simple planetary gear trains are of type I, that the sun wheels of the two simple planetary gear trains are linked and that one annulus gear is fixed and the other can rotate.

Remember that a simple planetary gear train of type I consists of a sun wheel, a planet carrier and its planet pinions, and an annulus gear.

More specifically, the manual drive device according to the invention is one wherein the epicyclic gearbox consists of the juxtaposition of two simple planetary gear trains of type I the sun wheels of which are mechanically linked so as to be driven simultaneously at the same speed and the annulus gear of the first planetary gear train of which is fixed and the other annulus gear of which can rotate, and which device has a reduction ratio less than or equal to 3.

In one of the embodiments, the planet pinions of the two gear trains are carried by a common planet carrier constituting the input of the reduction gearbox and the annulus gear of the second gear train constitutes the output of the reduction gearbox.

In the other embodiment, the planet carrier of the first planetary gear train is secured to the annulus gear of the second gear train and the planet carrier of the second gear train constitutes the output of the reduction gearbox, the input to the reduction gearbox being on the sun wheels.

For a reduction gearbox outside diameter of 20 mm, it is possible, in both embodiments, to obtain a reduction ratio less than 3, for example of 2.6.

BRIEF DESCRIPTION OF THE DRAWINGS

The appended drawing depicts the two embodiments of the invention.

DESCRIPTION OF THE PREFERRED EMBODIMENTS

The schematic depiction of the reduction gearboxes is the representation used by G. Henriot.

Just half of the planet carriers and of the annulus gears has been depicted relative to the axis of the reduction gearbox.

Figure 1:
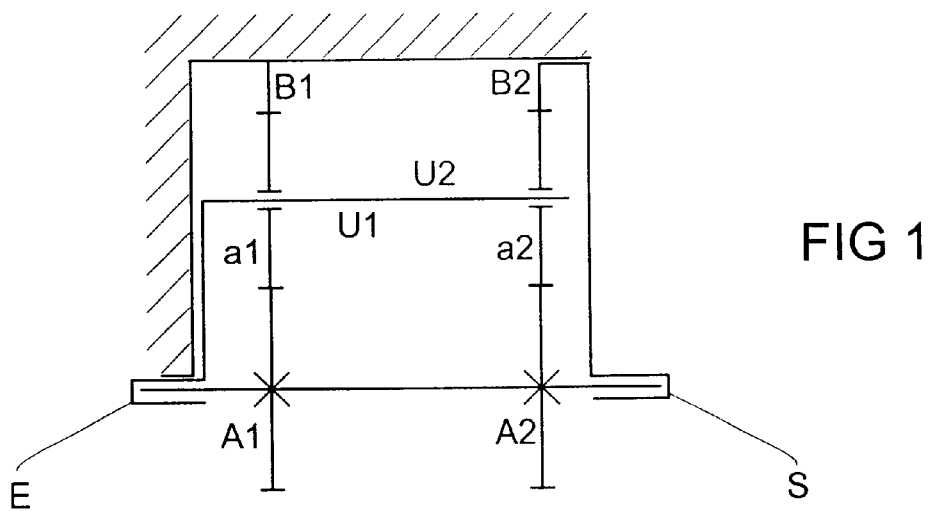
FIG. 1 depicts the first embodiment.

In the embodiment depicted in FIG. 1, the first simple planetary gear train consists of the sun wheel A1, of the annulus gear B1, and of the planet carrier U1 with its planet pinions a1. The second simple planetary gear train consists of the sun wheel A2, of the annulus gear B2, and of the planet carrier U2 with its planet pinions a2. The sun wheels A1 and A2 are rigidly mechanically linked so that they rotate at the same speed. They are of course coaxial. The planet carriers U1 and U2 are also linked so as to constitute a single planet carrier. The annulus gear B1 is fixed, that is to say prevented from rotating. The annulus gear B2 on the other hand is mounted so that it can rotate and constitutes the output S of the reduction gearbox directly driving the winding tube of the roller shutter or the like. The input E of the reduction gearbox is to the planet carrier U1U2. The planet carrier can be driven by any manual drive or operating means such as a chain, a cranking handle, etc.

In one exemplary version of this first embodiment, the elements of the reduction gearbox have the following characteristics:

| | |
|---|---|
| sun wheel A1: | 11 teeth |
| planet pinions a1: | 8 teeth |
| annulus gear B1: | 28 teeth |
| sun wheel A2: | 7 teeth |
| planet pinions a2: | 11 teeth |
| annulus gear B2: | 29 teeth | m=0.62 for A1, a1, B1 and Dp (B1)=17.36 m=0.53 for A2, a2, B2 and Dp (B2)=14.84 for a reduction ratio equal to 2.59.

Figure 2:
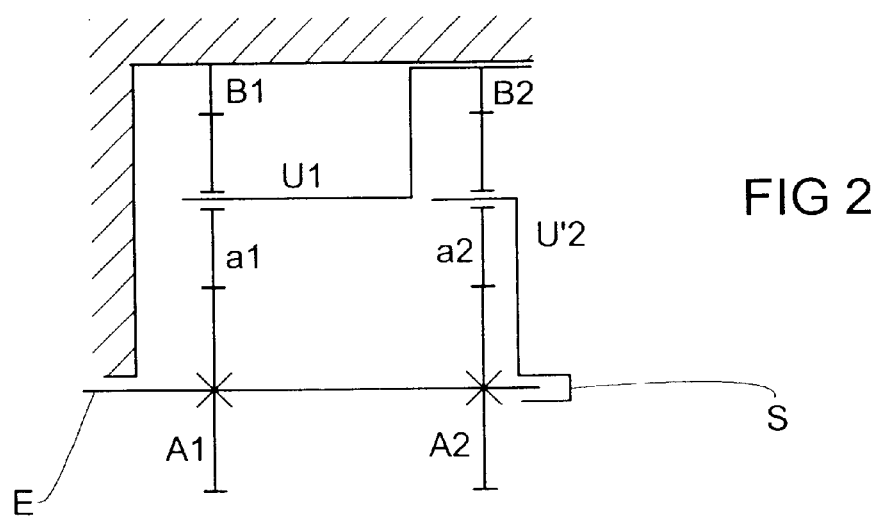
FIG. 2 depicts the second embodiment.

In the second embodiment depicted in FIG. 2, we again have the two simple planetary gear trains A1, B1, a1 and A2, B2, a2 and the two sun wheels A1 and A2 are once again mechanically linked so as to rotate at the same speed. The annulus gear B1 of the first planetary gear train is once again fixed. The planet carrier U1 carrying the planet pinions a1 of the first gear train is secured to the annulus gear B2 of the second gear train and the output of the reduction gearbox is on the planet carrier U'2 of the second gear train.

In one exemplary version of this second embodiment, the elements of the reduction gearbox have the following characteristics:

| | |
|---|---|
| sun wheel A1: | 7 teeth |
| planet pinions a1: | 9 teeth |
| annulus gear B1: | 26 teeth |
| sun wheel A2: | 8 teeth |
| planet pinions a2: | 10 teeth |
| annulus gear B2: | 28 teeth | m=0.66 for A1, a1, B1 and Dp (B1)=17.16 m=0.53 for A2, a2, B2 and Dp (B2)=14.84 for a reduction ratio equal to 2.58.

Although illustrative embodiments of the invention have been shown and described, a wide range of modification, change and substitution is contemplated in the foregoing disclosure and in some instances, some features of the present invention may be employed without a corresponding use of the other features. Accordingly, it is appropriate that the appended claims be construed broadly and in a manner consistent with the scope of the invention.

What is claimed:

1. A drive device for manually driving a blind/shutter device equipped with a winding shaft, comprising an epicyclic reduction gearbox between a manual driving means and the winding shaft of the blind, wherein the epicyclic gearbox includes two simple juxtaposed planetary gear trains, sun wheels of which are mechanically linked so as to be driven simultaneously at the same speed and an annulus gear of the first planetary gear train of which, on the input side of the reduction gearbox, is fixed and another annulus gear of which can rotate, and which the device has a reduction ratio less than or equal to 3, wherein planet pinions (a1, a2) of the two gear trains are carried by a common planet carrier constituting the input of the reduction gearbox and wherein the annulus gear (B2) of the second planetary gear train constitutes the output of the reduction gearbox.

2. A drive device for manually driving a blind/shutter device equipped with a winding shaft, comprising an epicyclic reduction gearbox between a manual driving means and the winding shaft of the blind, wherein the epicyclic gearbox includes two simple juxtaposed planetary gear trains, sun wheels of which are mechanically linked so as to be driven simultaneously at the same speed and an annulus gear of the first planetary gear train of which, on the input side of the reduction gearbox, is fixed and another annulus gear of which can rotate, and which the device has a reduction ratio less than or equal to 3, wherein a planet carrier (U1) of the first planetary gear train is secured to the annulus gear (B2) of the second planetary gear train and wherein a planet carrier (U2) of the second gear train constitutes the output of the reduction gearbox, the input to the reduction gearbox being on the sun wheels (A1, A2).

* * * * *